May 21, 1935.   J. E. LARASON   2,001,736
POWER TRANSMISSION DEVICE
Filed July 17, 1934

INVENTOR
JOHN E. LARASON
ATTORNEYS

Patented May 21, 1935

2,001,736

UNITED STATES PATENT OFFICE 2,001,736

POWER TRANSMISSION DEVICE

John E. Larason, Dayton, Ohio

Application July 17, 1934, Serial No. 735,717

15 Claims. (Cl. 170—177)

(Granted under the act of March 3, 1883, as
amended April 30, 1928; 370 O. G. 757)

Tht invention described herein may be manufactured and used by or for the Government for governmental purposes, without the payment to me of any royalty thereon.

The present invention relates generally to driving connections and more particularly to improved means for driving a propeller from the engine of an aircraft.

The primary object of the present invention is to provide in combination with an aircraft engine shaft, coupling means for effecting a yieldable driving connection between the engine shaft and the propeller adapted primarily for absorbing torque reactions to which the engine shaft is subjected during running operation of the engine so that the vibrational effects ordinarily transmitted from the engine to the propeller or vice versa will be materially reduced.

A further object of the present invention is to provide a coupling sleeve interconnecting the engine shaft and hub of an aircraft propeller, which is capable of yielding under torque reactions and which due to its particular construction and its cooperative relation with respect to the engine drive shaft materially reduces the restoring couple set-up by the propeller in responding to the torque impulse transmitted from the engine shaft without requiring any change in the positioned relationship of the propeller and engine. Thus the period of vibration of the propeller due to torque reaction transmitted from the engine is substantially reduced so as to occur at a point materially below the normal cruising speed range of the engine.

Figure 1:
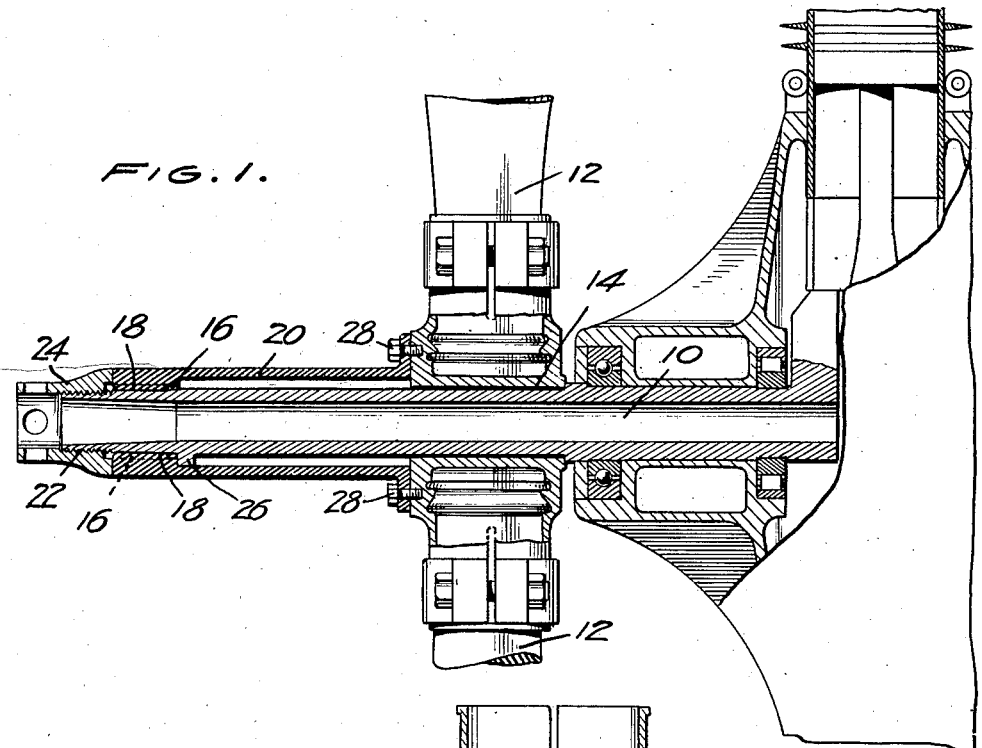
Figure 2:
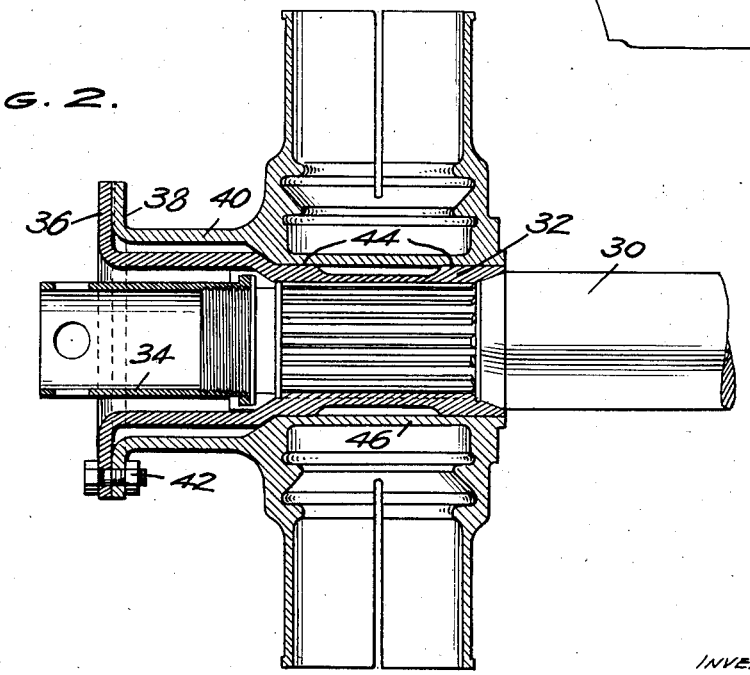

A still further object of the present invention is to provide a simple efficient device of the kind stated, and to this end consists in a novel combination and arrangement of parts to be hereinafter described and claimed, reference being had to the accompanying drawing in which Fig. 1 is a cross-sectional view of one modification of my invention as applied to the extended crank shaft of an air-cooled, internal-combustion engine; and Fig. 2 is a modified form of the invention in Fig. 1.

Referring more particularly to the drawing, wherein corresponding parts are designated by like numerals throughout the several views, there is provided a driving member and a driven member having a yieldable driving connection with the driving member.

As shown in Fig. 1, one of the said members comprises a drive shaft 10 of an internal-combustion engine carrying the other member, which may be a wheel pulley, gear or the like, but which is shown herein as constituting an aircraft propeller. The internal diameter of the hub portion 14 of the propeller is sufficiently greater than the outer diameter of the drive shaft 10 of the engine as to permit the drive shaft passing freely through the said hub portion. Thus the engine shaft forms a bearing support for the hub portion of the propeller. The engine shaft 10 extends forwardly of and beyond the propeller a distance approximately twice the width of the hub portion of the propeller and is provided adjacent its forward end with splined teeth 16, the latter engaging the internal splines 18 of an elongated coupling sleeve 20 of high grade steel, which is coaxial with and spaced from the shaft 10 approximately throughout its entire length. The outer extreme end of the shaft 10 is threaded as shown at 22 for receiving therein a locking nut 24 to draw the splined end of the sleeve 20 tightly against a shoulder 26 formed on the shaft 10.

The inner or opposite end of the sleeve 20 is flanged exteriorly and bolted to the hub portion of the propeller by bolts 28.

Thus it will be seen that I have provided a coupling sleeve connected at its forward end to the extended end of the drive shaft and at its rearward end to the hub portion of the propeller 12 and capable of yielding under torque impulses transmitted from the engine during its running operation. By means of the arrangement set forth hereinabove it makes possible the fact that the coupling sleeve may be disposed substantially, if not entirely forward of the plane of rotation of the propeller. In aeronautical parlance this plane of rotation is generally referred to as the disc of the propeller.

In so doing an effective couple of considerable length is obtained between the drive shaft and propeller without requiring any change in the normal positioned relationship of the propeller and crank shaft, the effect of which is to materially reduce the period of vibration of the propeller below that normally obtained by driving the propeller direct from the crank shaft by reason of the fact that the restoring couple set-up in the propeller is materially reduced. The length of the coupling sleeve 20 and extension of the drive shaft will, of course, depend entirely upon the flexibility desired in any particular engine and propeller. Also the thickness of the material of the sleeve 20 in cross-section may be materially decreased to obtain the flexibility desired in particular engines or propellers. The amount of yield per foot of unit length for a given diameter and thickness of wall will depend, under ordinary circumstances, upon the weight and torque characteristics of the propeller as well as the horse power of the engine upon which the propeller is mounted.

Fig. 2 illustrates a modification of the invention illustrated in Fig. 1. In this instance the drive shaft 30 of the engine is of conventional length and splined at its outer end to receive the internally splined inner end of a coupling sleeve 32, the latter being held firmly in place in the drive shaft by a conventional lock nut 34. The sleeve 32 includes an enlarged forward extension provided with a flanged portion 36 against which the flanged end portion 38 of an elongated hub extension 40 is adapted to abut, said flanged portions having suitable openings for receiving locking bolts 42 adapted for firmly connecting the sleeve 32 with the hub of the propeller. As shown in Fig. 2, the splined driving connection between the sleeve 32 and drive shaft 30 lies within the area defined by the limits of the hub portion. It should also be noted that the rearward end of the sleeve 32 is provided with a bearing portion 44 upon which the hub portion 46 of the propeller is freely rotatable.

Thus a simple, yet efficient driving connection is established between the engine drive shaft and propeller, which operates to effectively reduce the vibrational effects due to torque impulses transmitted from the engine.

I claim.

1. In combination, a propeller having a hub portion, an engine shaft extending freely through and beyond said hub portion, and coupling means interconnecting the free end of said shaft and said hub portion for driving said propeller.

2. In combination, a propeller having a hub portion, an engine shaft extending freely through and beyond said hub portion, and coupling means interposed between and connected at its opposite ends to said hub portion and engine shaft, the portion of said coupling means intermediate its connected ends lying forward of the disc of said propeller.

3. In combination, a propeller having a hub portion, an engine shaft extending freely through and beyond said hub portion, and a coupling sleeve interposed between and connected at its opposite ends to said hub portion and engine shaft, the intermediate portion of said coupling sleeve extending forwardly of the disc of said propeller a distance at least equal to the width of its hub portion.

4. In combination, a propeller having a hub portion, an engine shaft extending freely through and beyond said hub portion, and coupling means interconnecting the free end of said shaft and said hub portion for driving said propeller and extending forwardly of the disc of said propeller a distance at least equal to the width of its hub portion.

5. In combination, a propeller having a hub portion, an engine shaft extending freely through and beyond said hub portion, and a coupling sleeve interconnecting the free end of said engine shaft and said hub portion and lying entirely forward of the disc of said propeller.

6. In combination, a propeller having a hub portion, an engine shaft extending freely through and beyond said hub portion a distance equal, at least, to the width of said hub portion, and a coupling sleeve interconnecting the free end of said engine shaft and said hub portion for driving said propeller.

7. In combination, a propeller having a hub portion, an engine shaft extending freely through and beyond said hub portion a distance greater than the width of said hub portion, and a coupling sleeve interconnecting the free end of said engine shaft and said hub portion for driving said propeller.

8. In combination, a propeller having a hub portion, an engine shaft extending beyond said hub portion a distance approximately twice the width of said hub portion, and a coupling sleeve interconnecting the free end of said engine shaft and said hub portion for driving said propeller.

9. In combination, a propeller having a hub portion, an engine shaft extending freely through and beyond said hub portion, and a coupling sleeve coaxial with said engine shaft and spaced therefrom substantially throughout its entire length, said sleeve lying entirely forward of the disc of said propeller and being connected at its opposite ends to the free end of said shaft and said hub portion respectively.

10. In combination, a propeller having a hub portion, an engine shaft extending freely through and beyond said hub portion, and a coupling sleeve connected at its opposite ends to said shaft and said hub portion, the one connected end of said sleeve lying well forward of the hub portion of said propeller.

11. In combination, a propeller having a hub portion, an engine shaft extending freely through and beyond said hub portion, and coupling means interconnecting the free end of said shaft and said hub portion for driving said propeller, the junction of said sleeve and said engine shaft lying forwardly of said hub portion.

12. In combination, a propeller having a hub portion, an engine shaft extending freely through and beyond said hub portion, and a coupling sleeve rigidly connected at its one end to the extended free end of said engine shaft and at its opposite end to the hub portion of said propeller.

13. In combination, a propeller hub having a coaxial annular extension disposed forwardly thereof, an engine shaft extending through and beyond said propeller hub, and a coupling sleeve intermediate said shaft and propeller hub having a driving connection with said engine shaft at its one end and with said annular extension at its opposite end.

14. In combination, a propeller hub having a coaxial annular extension disposed forwardly thereof, an engine shaft extending through and beyond said propeller hub, and a coupling sleeve interposed between said engine shaft and propeller hub having a driving connection with said engine shaft at its one end disposed within the limits of said hub and at its opposite end with said annular extension.

15. In combination, a propeller hub having a coaxial annular extension disposed forwardly thereof, an engine shaft extending through said propeller hub, and a coupling sleeve interposed between said propeller hub and said shaft, said sleeve having a driving connection with said engine shaft at its one end disposed within the limits of said hub and at its opposite end with said forwardly disposed annular extension, the rear portion of said sleeve forming a bearing upon which said propeller hub is freely mounted.

JOHN E. LARASON.